United States Patent [19]

Taketani et al.

[11] Patent Number: 6,010,563
[45] Date of Patent: Jan. 4, 2000

[54] ANTICORROSIVE PIGMENT COMPOSITION AND COATING COMPOSITIONS CONTAINING THE SAME

[75] Inventors: Yukihiko Taketani, Nishinomiya; Hajime Kondo, Osaka, both of Japan

[73] Assignee: Tayca Corporation, Japan

[21] Appl. No.: 08/982,723

[22] Filed: Dec. 2, 1997

[30] Foreign Application Priority Data

Dec. 2, 1996 [JP] Japan .................... 8-337465

[51] Int. Cl.[7] .............. C08K 3/10; C08K 3/32; C08K 3/34; C09D 5/08
[52] U.S. Cl. .................. 106/14.12; 106/14.34; 106/14.39; 106/14.44; 106/462; 106/467
[58] Field of Search .............. 106/14.12, 14.34, 106/14.39, 14.44, 462, 467

[56] References Cited

U.S. PATENT DOCUMENTS

| | | | |
|---|---|---|---|
| 4,400,365 | 8/1983 | Haacke et al. | 106/14.12 |
| 4,657,963 | 4/1987 | Matsumoto et al. | 524/406 |
| 4,746,568 | 5/1988 | Matsumoto et al. | 428/323 |
| 5,262,464 | 11/1993 | Koevenig et al. | 524/413 |

FOREIGN PATENT DOCUMENTS

| | | |
|---|---|---|
| 06101075 | 4/1994 | Japan . |
| 08283619 | 10/1996 | Japan . |

OTHER PUBLICATIONS

WPIDS Abstract No. 89–161419, abstract of Japanese Patent Specification No. 01–103437, Apr. 1989.

*Primary Examiner*—Anthony Green
*Attorney, Agent, or Firm*—Millen, White, Zelano, & Branigan, P.C.

[57] ABSTRACT

A nontoxic anticorrosive pigment composition free from toxic heavy metals comprises a condensed phosphoric acid aluminum salt, typically aluminum dihydrogen tripolyphosphate, and magnesium silicate, typically magnesium hexasilicate. The anticorrosive pigment composition enhances the thermal resistance of paint films when formulated in a coating composition containing a chlorine-containing vinyl polymer such as vinyl chloride-vinylidene chloride copolymer emulsion paints.

6 Claims, No Drawings

ANTICORROSIVE PIGMENT COMPOSITION AND COATING COMPOSITIONS CONTAINING THE SAME

BACKGROUND OF THE INVENTION

1. Field of the Invention

This invention relates to a novel anticorrosive pigment composition and coating compositions containing the same. More particularly, this invention relates to an anticorrosive pigment composition which does not adversely affect, when formulated in an anticorrosive paint, particularly of vinyl chloride-vinylidene chloride copolymer emulsion type, the storage stability of paints and the thermal resistance of paint films.

2. Brief Description of the Prior Art

It is well-known that Pb or Cr based anticorrosive pigments present serious environmental problems. Accordingly, several types of nontoxic or low toxic anticorrosive pigments have been proposed and emerged on the market. U.S. Pat. No. 4,966,630 assigned to the assignee of this application discloses an anticorrosive pigment free from toxic heavy metals comprising aluminum dihydrogen tripolyphosphate and zinc oxide. However, it has been pointed out that when formulated in paints with a vinyl chloride-vinylidene chloride copolymer vehicle resin, this pigment adversely affects the thermal stability of the paint films.

To overcome this disadvantage, JP-A-08283619 discloses a nontoxic anticorrosive pigment composition comprising a condensed phosphate salt and calcium metasilicate. JP-A-06101075 discloses a similar pigment composition comprising a condensed phosphate salt and magnesium oxide. Other known attempts include to combine a condensed phosphate salt with calcium ion exchanged silica.

Unfortunately, these attempts have been proven to be not fully successful in terms of anticorrosity activity and storage stability of paint compositions incorporating the pigment. Therefore, a need exists for a nontoxic pigment composition which will eliminate or ameliorate disadvantages associated with known nontoxic pigment compositions.

SUMMARY OF THE INVENTION

According to the present invention, the above need can be met by providing an anticorrosive pigment composition comprising a condensed phosphoric acid aluminum salt and magnesium silicate.

In a preferred embodiment of the invention, the pigment composition comprises aluminum dihydrogen tripolyphosphate and magnesium hexasiliate at a weight ratio from about 90:10 to about 20:80, more preferably from about 80:20 to about 30:70.

In another aspect, the present invention provides an anticorrosive paint composition comprising the anticorrosive pigment composition of the present invention. The paint may be formulated in water-based-, solvent-, air drying- or baking type depending upon the type of particular vehicle resins used. In a preferred embodiment of the invention, the vehicle is a vinyl chloride-vinylidene chloride copolymer emulsion. The anticorrosive pigment of the present invention, when formulated with this emulsion, rather enhances the thermal stability of the paint films while exhibiting remakable anticorrosive activity. Also, the resulting emulsion paint exhibits a satisfactory storage stability for a long period of time.

Other features and advantages of the present invention will become apparent as the following detailed description proceeds.

DETAILED DESCRIPTION OF THE INVENTION

The condensed phosphoric acid aluminum salt which can be used in the present invention is preferably hardly soluble in water and has an acidity as solid acid as high as about 2 to about 6 meq/g. Typical examples thereof include aluminum dihydrogen tripolyphosphate and aluminum metaphosphate. Aluminum dihydrogen tripolyphosphate is particularly preferred.

Several varieties of magnesium silicate are known including magnesium metasilicate, magnesium trisilicate, magnesium tetrasilicate and magnesium hexasilicate, all of which may be used in the present invention to advantage. Only requirement is that they are of pigment grade. Magnesium hexasilicate of the formula: $2MgO.6SiO_2.nH_2O$ is, among others, particularly preferable. This salt is amphoteric and acts as a solid acid and also as a solid base. Accordingly, this salt can adsorb both acids and bases.

The condensed phosphoric acid aluminum salt and magnesium silicate are combined at a weight ratio from 90:10 to about 20:80, preferably from about 80:20 to about 30:70. If the proportion of condensed phosphoric acid aluminum salt is too excessive, then the thermal stability of chlorine-containing polymers present in the paint film will be not reach a satisfactory level. Conversely, if the above proportion is two small, the pigment is incapable of forming a passive layer on the substrate and thus exhibits poor anticorrosive activity.

The above two ingredients may be combined by any desired process, namely dry process or wet process. For use in stability-sensitive formulations or vehicle resins, the pigment composition produced by the wet process conducted for a period from 30 minutes to 3 hours at a temperature from room temperature to 90° C. is preferable.

The anticorrosive pigment composition of the present invention may be formulated into an anticorrosive paint composition using any conventional vehicle resin or polymer known in the art including boiled oil, oily varnish, phenol resins, aminoplast resins, epoxy resins, polyester resins including alkyd resins, polyurethanes, vinyl resins, acrylic resins, fluororesins, chlorinated rubber, cyclized rubber, cellulose derivatives or a combination thereof. Preferred vehicle resins are air drying epoxy resins, thermosetting epoxy resins, air drying alkyd resins and vinyl chloride-vinylidene chloride copolymers. Vinyl chloride-vinylidene chloride copolymer emulsions are most preferable. The emulsion may be modified with, for example, an acrylic monomer or may be used in combination with a melamine resin, phenol resin, epoxy resin or alkyd resin provided that the characteristic performance of the vinyl chloride-vinylidene chloride copolymer is not impaired seriously. The amount of the anticorrosive pigment composition of the present invention may vary within a wide range depending upon the particular application of the paint composition but generally ranges between about 5% and 20% by weight of vehicles resin as solids.

EXAMPLE

The following examples are intended to illustrate this invention in further detail and should by no means be construed as being limitative. All parts and percents therein are by weight unless otherwise indicated.

Example 1

Anticorrosive Pigment Compositions

Anticorrosive pigment compositions A to G according to this invention were prepared by dry blending varying amounts (parts) of aluminium dihydrogen tripolyphosphate (ATP) and magnesium hexasilicate in a laboratory mixer (Matsushita Electric Industrial Co., Ltd. Model MX-60) for 5 minutes. Similarly, anticorrosive pigment compositions H and I were produced by replacing Mg hexasilicate with zinc oxide or calcium silicate and used for comparative purposes.

TABLE 1

| Pigment Composition | ATP[1] | Mg hexasilicate[2] | ZnO[3] | CaSiO$_3$[4] |
|---|---|---|---|---|
| A | 20 | 180 | — | — |
| B | 40 | 160 | — | — |
| C | 60 | 140 | — | — |
| D | 100 | 100 | — | — |
| E | 160 | 40 | — | — |
| F | 180 | 20 | — | — |
| G | 195 | 20 | — | — |
| H | 140 | — | — | 60 |
| I | 140 | — | 60 | — |

[1]K-Fresh #100P, Tayca Corp.
[2]KYOWAAD 600, Kyowa Chemical Industry Co.
[3]Mitsui Mining & Smelting Co.
[4]Calcium metasilicate, NYCO

Example 2

Anticorrosive Paints and Test Panels

Water-based anticorrosive paint compositions were prepared according to the formulation of Table 2. To a 200 ml stainless steel beaker provided with double walled water jacket were added water, thickening agent, defoaming agent, wetting agend and dispersant. The mixture was stirred at a low speed to make a dispersion. To this were added the anticorrosive pigment composition of Table 1, talc and titanium dioxide while stirring by a high speed disperser (VMA -Getzmann AG) for 40 minutes under cooling. Then acryl-modified vinyl chloride-vinylidene chloride copolymer emulsion containing ammonia, butyl celloselve and sodium nitrite solution were added and mixed under low speed stirring for 5 minutes. The anticorrosive pigment composition content was 11.0% on solid basis, PVC was 35.0% and pigments/binder resin ratio was 1.0.

TABLE 2

| Material | % |
|---|---|
| Water | 11.22 |
| Thickening agent[1] | 0.14 |
| Defoaming agent[2] | 0.22 |
| Wetting agent[3] | 3.67 |
| Wetting agent[4] | 0.34 |
| Dispersant[5] | 0.57 |
| Anticorrosive pigment of Table 1 | 6.67 |
| Talc[6] | 20.62 |
| Titanium dioxide[7] | 2.30 |
| Butyl cellosolve | 1.58 |
| Acryl-modified vinyl chloride vinylidene chloride copolymer emulsion [8] | 51.28 |
| 28% ammonia | 0.50 |
| 10% sodium nitrite[9] | 0.80 |
| Total | 100.00 |

[1]Benton LT, NL Industries Inc.
[2]Foamaster S, Diamond Shamrock Corp.
[3]Simplonic (30%), ICI Chem. & Poly.
[4]Surfinol 104H, Air Products Chemicals
[5]BYK 155, BYK Chemie
[6]Simgon, Nippon Talc Co.
[7]JR-701, Tayca Corp.
[8] Haloflex 202, ZENECA Resins, 60% solids
[9]Spot rust preventing agent Test panels were prepared by applying the paint onto a mild steel plate (SPCC-SB available from Nippon Test Panel Co.) using a bar coater to a dry film thickness of 40±5 microns and then air dried at 83° C. for 10 minutes.

Example 3

Storage Stability Test

A sample of each paint compositions prepared in Example 2 was placed in a 250 ml polyolefin bottle and hermetically sealed with a cap. The bottle was placed in an isothermal chamber maintained at a constant temperature of 40° C. for 28 days. The change of viscosity with time was observed at several intervals at a sample temperature of 20° C. using a B-type viscometer. The results are shown in Table 3.

| Pigment Composition | Viscosity, mPa · s Days | | | | | |
|---|---|---|---|---|---|---|
| | Initial | 1 | 7 | 14 | 21 | 28 |
| A | 1400 | 2850 | Gelled | — | — | — |
| B | 1050 | 2160 | 3260 | 3580 | 3880 | 3980 |
| C | 890 | 1100 | 2230 | 2950 | 3320 | 3410 |
| D | 990 | 1050 | 2830 | 3240 | 3080 | 2810 |
| E | 610 | 610 | 1990 | 2290 | 2870 | 2860 |
| F | 400 | 450 | 810 | 1880 | 1930 | 2150 |
| G | 400 | 410 | 760 | 1400 | 1430 | 1510 |
| H | 870 | 2060 | 4200 | 4400 | 4750 | 6500 |
| I | 550 | 560 | 1140 | 1320 | 1590 | 1480 |

As shown in Table 3, paint compositions containing the anticorrosive pigment compositions of this invention exhibited higher storage stability than that of the paint composition containing pigment composition H in this accelerated storage stability test. This confirms that the paint compositions are acceptable in terms of storage stability in practice.

Example 4

Film Heat Resistance

Each test panel prepared in Example 2 was placed in a hot air-circulating oven maintained at 140° C. and 170° C.

respectively. One hour after the panel was removed from the oven and measured color change of the coating film in terms of L*, a* and b* values using a standard calorimeter. The results are shown in Table 4.

TABLE 4

| Pigment Composition | Initial | | | 140° C. × 1 hr. | | | 170° C. × 1 hr. | | |
|---|---|---|---|---|---|---|---|---|---|
| | L* | a* | b* | L* | a* | b* | L* | a* | b* |
| A | 78.9 | -2.2 | +4.5 | 76.0 | -1.5 | +9.4 | 59.9 | +3.8 | +14.1 |
| B | 79.1 | -2.4 | +4.7 | 76.1 | -1.5 | +9.5 | 57.1 | +3.1 | +10.5 |
| C | 78.8 | -2.4 | +4.6 | 75.2 | -1.8 | +9.5 | 54.2 | +4.1 | +9.8 |
| D | 79.0 | -2.4 | +4.8 | 75.1 | -1.6 | +9.7 | 52.0 | +3.9 | +14.4 |
| E | 78.8 | -2.0 | +4.3 | 69.9 | -0.4 | +13.9 | 49.7 | +5.2 | +15.1 |
| F | 76.2 | -2.1 | +4.2 | 48.1 | +1.2 | +8.0 | 32.0 | +1.4 | +3.1 |
| G | 74.5 | +0.8 | +11.2 | 43.1 | +0.4 | +4.2 | 31.0 | +0.5 | +1.4 |
| H | 75.4 | -2.4 | +4.2 | 56.0 | +2.0 | +12.2 | 37.4 | +2.2 | +5.9 |
| I | 79.7 | -2.2 | +1.2 | 28.1 | -0.1 | +0.4 | 30.2 | -0.1 | +0.4 |

In this test, the lightness (L*) values upon exposure the film at 140° C. for 1 hour are practically significant. As is well-known, chlorine-containing vinyl polymers are susceptible to dehydrochlorination upon heating with darkening. Therefore, decrease in the lightness value upon heating is as a rule inversely proportional to the thermal stability of paint films. A lightness value L* in the order of 70–80 represents white in color while a lightness value L* in the order of 30 represents black in color. Lightness values higher than about 40 have been considered to be acceptable in practice. As shown in Table 4, the paint films containing anticorrosive pigment compositions A to G, particularly A to E, exhibited satisfactory heat resistance whereas the paint film containing ZnO-containing anticorrosive pigment composition I exhibited poor heat resistance.

Example 5

Anticorrosive Test

Test panels prepared in Example 2 were cut in a cross with knife reaching the substrate and subjected to the following test methods.

Method 1

The panel was continuously sprayed with a 5% NaCl aqueous solution for 24 hours at a spray pressure of 1 kg/cm² at a chamber inner temperature of 35° C.

Method 2

The panel was sprayed with an aqueous solution containing 0.35% ammonium sulfate and 0.05% NaCl for 1 hour at 25° C. and then dried at 35° C. for 1 hour in one cycle. This cycle was repeated 207 times (504 hours).

The panel was then evaluated in terms of blister and rust according to the following schedule.

Blister in Flat Area

Percents of blister area in the total area according to ASTM D714-56.

5:0% 4:<0.2% ; 3:<0.5% ; 2:>1% 1:>3% ; 0:>3%
Rust in Flat Area:
Percents of rust in the total area according to ASTM D714-56.

5:0% ; 4:0.03–0.1% 3:0.3–1%; 2:<3% ; 1:<10% ; 0:>16%;

Width of Corrosion:

The maximum width of corrosion developed along the cut line in a perpendicular direction was measured and evaluated according to the following schedule.

5:<1 mm ; 4:1–2 mm ; 3:2–4 mm; 2:4–7 mm ; 0:>10 mm.
Comprehensive Evaluation
Total points of all items.
The results are shown in Table 5.

TABLE 5

| | Method 1 | | | | Method 2 | | | |
|---|---|---|---|---|---|---|---|---|
| Pigment | Flat area | | Cut | | Flat area | | Cut | |
| Composition | Bliter | Rust | area | Total | Bliter | Rust | area | Total |
| A | 2 | 4 | 0 | 6 | 5 | 4 | 1 | 10 |
| B | 5 | 5 | 1 | 11 | 5 | 5 | 3 | 13 |
| C | 5 | 5 | 2 | 12 | 5 | 5 | 3 | 13 |
| D | 5 | 5 | 4 | 14 | 5 | 5 | 4 | 14 |
| E | 5 | 5 | 3 | 13 | 5 | 5 | 4 | 14 |
| F | 5 | 5 | 1 | 11 | 5 | 5 | 3 | 13 |
| G | 0 | 5 | 0 | 5 | 5 | 5 | 2 | 12 |
| H | 0 | 5 | 0 | 5 | 5 | 5 | 2 | 12 |
| I | 5 | 5 | 4 | 14 | 5 | 5 | 3 | 13 |

As shown in Table 5, paint films containing anticorrosive pigment compositions C to F exhibited remarkable anticorrosive performance (11 point or higher) in both Method 1 and Method 2.

Summining up the results shown in Tables 3–5, pigment compositions B to F satisfy with all of anticorrosive property, heat resistance and storage stability requirements as shown in Table 6.

TABLE 6

| Pigment Composition | Anticorrosive Property | | Heat Resistance, at 140° C. | Storage Stability 40° C. × 28 days |
|---|---|---|---|---|
| | Method 1 | Method 2 | | |
| A | Bad | Bad | Good | Bad |
| B | Good | Good | Good | Good |
| C | " | " | " | " |
| D | " | " | " | " |
| E | " | " | " | " |
| F | " | " | " | " |
| G | Bad | Fair | Fair | Good |

TABLE 6-continued

| Pigment Composition | Anticorrosive Property Method 1 | Method 2 | Heat Resistance, at 140° C. | Storage Stability 40° C. × 28 days |
|---|---|---|---|---|
| H | Bad | Fair | Good | Bad |
| I | Good | Good | Bad | Good |

Example 6

Analogous to the preceeding examples, the effects of exposure of coated panels to heat at 177° C. for 15 minutes on the heat resistance and the subsequent salt spray testing were tested.

The anticorrosive pigment compositions used in this test were pigment compositions D and H as well as Ca and Sr modified zinc phosphosilicate available from Halox under the name of SZP-391 and magnesium tetrasilicate. The paint formulation and coating conditions were same as in Example 2. The anticorrosive test was conducted after exposing coated panels prepared under the above conditions by spraying a 5% NaCl aqueous solution at 35° C. for 240 hours and evaluation was made as in Example 5. The results are shown in Table 7 and Table 8.

TABLE 7

Heat Resistance

| Pigment Composition | L* | a* | b* |
|---|---|---|---|
| Mg tetrasilicate | 42.8 | +0.1 | +3.1 |
| D | 75.2 | −0.1 | +8.3 |
| H | 28.7 | −0.2 | +0.3 |
| SZP-391 | 29.1 | −0.3 | +0.4 |

TABLE 8

Anticorrosive Test

| Pigment Composition | Flat area Blister | Rust | Cut area | Total |
|---|---|---|---|---|
| Mg tetrasilicate | 1 | 3 | 0 | 4 |
|  | (1) | (5) | (3) | (9) |
| D | 5 | 5 | 3 | 13 |
|  | (5) | (5) | (3) | (13) |
| H | 0 | 4 | 0 | 4 |
|  | (5) | (5) | (0) | (10) |
| SZP-391 | 0 | 3 | 3 | 6 |
|  | (3) | (4) | (0) | (7) |

Note: Values in parentheses indicate those before exposure to heat.

As shown in Tables 7 and 8, the paint film containing pigment composition D was not adversely affected in the anticorrosive property by the exposure to heat.

Example 7

The heat stablity of paint films prepared as in Example 2 was evaluated in terms of the quantity of HCl generated upon heating. The coated panel was placed in a 3 liter gas sampling bag, purged with nitrogen gas, and heated at 120° C. for three hours. The concentration of HCl gas in the bag was determined using a hydrogen chloride dector tube Model No. 14L available from Gas Tech Company. The results are shown in Table 9.

TABLE 9

| | Pigment Composition | | |
|---|---|---|---|
| Item | D | H | Mg tetrasilicate |
| HCl concentration, ppm | 1.0 | 4000 | 500 |
| Binder resin in paint film, g | 0.58 | 0.86 | 0.67 |
| mg HCl/g Resin | 0.01 | 22.7 | 3.6 |

As shown in Table 9, the amount of HCl generated from the paint film containing pigment composition D is very low. This suggests that the pigment composition D would be effective as a heat stabilizer of chlorine-containing vinyl polymers.

Example 8

The anticorrosive activity of the pigment composition of this invention was tested in an epoxy resin primer coating composition in comparison with zinc phosphate and Ca/Sr modified zinc phosphosilicate.

Anticorrosive pigment compositions and loading levels thereof are as follows.

| Pigment Composition | Loading level in film |
|---|---|
| Pigment Composition D | 10% |
| Zinc Phosphate | 10% |
| SZP-391 | 10% |

As a control, a corresponding coating composition free from any anticorrosive pigment was prepared.

| Coating Composition Formulation: | | |
|---|---|---|
| Loading level | Control 0% | Test Composition 10% |
| Anticorrosive pigment | 0 | 6.7 |
| BaSO$_4$ | 21.7 | 20.4 |
| Talc | 10.6 | 5.2 |
| TiO$_2$ (JR-701, Tayca) | 10.6 | 10.6 |
| EPIKOTE 1001 (70% nonvolatiles, Shell Chemicals) | 20.4 | 20.4 |
| Versamid 230 (60% nonvolatiles, Henkel Hakusui) | 15.8 | 15.8 |
| Solvent (xylene/n-butanol = 1/1) | 20.9 | 20.9 |
| Total | 100.0 | 100.0 |

The above coating compositions were applied on a galvanized steel plate to a dry film thickness of about 30 microns and dried at room temperature for 7 days. Then, the coated test panels were sprayed with 5% aqueous solution of NaCl at 35° C. for 1440 hours and evaluated as in Example 5. The results are shown in Table 10.

TABLE 10

| Pigment | Flat area | | | |
| --- | --- | --- | --- | --- |
| | Blister | Rust | Cut area | Total |
| Control | 3 | 5 | 0 | 8 |
| D | 5 | 5 | 3 | 13 |
| Zinc Phosphate | 2 | 5 | 0 | 7 |
| SZP-391 | 3 | 5 | 0 | 8 |

As shown in Table 10, the anticorrosive pigment composition of this invention was effective when formulated in epoxy-based primer coating compositions.

We claim:

1. An anticorrosive pigment composition comprising a mixture of aluminum dihydrogen tripolyphosphate and magnesium hexasilicate at a weight ratio of aluminum dihydrogen tripolyphosphate to magnesium hexasilicate of from about 90:10 to about 20:80.

2. An anticorrosive pigment composition according to claim 1 wherein said weight ratio is from about 80:20 to about 30:70.

3. A coating composition comprising a water-based or organic solvent based vehicle and from about 5 to about 20% by weight of said vehicle as solids of the anticorrosive pigment composition of claim 1, said pigment composition being dispersed in said vehicle.

4. A coating composition according to claim 3 wherein said vehicle is an emulsion of vinyl chloride-vinylidene chloride copolymer.

5. A coating composition according to claim 4 wherein said vinyl chloride-vinylidene chloride copolymer is modified with an acrylic monomer.

6. A coating composition according to claim 3 wherein said vehicle is in an organic solvent based vehicle.

* * * * *